J. J. OGDEN.
COTTON HARVESTER.
APPLICATION FILED APR. 28, 1916.
1,238,047.
Patented Aug. 21, 1917.
5 SHEETS—SHEET 1.
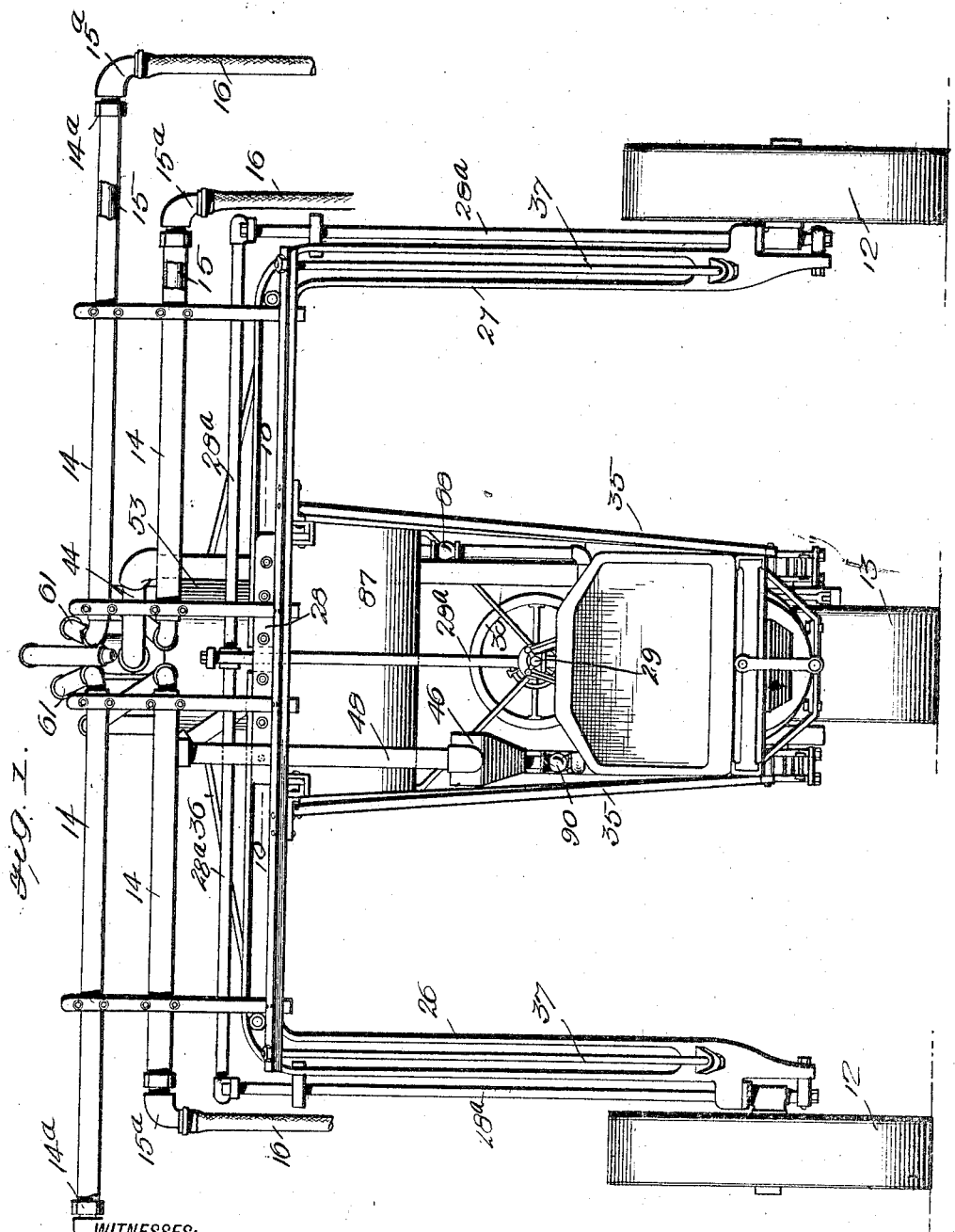
WITNESSES:
INVENTOR
Joseph J. Ogden
BY
ATTORNEYS J. J. OGDEN.
COTTON HARVESTER.
APPLICATION FILED APR. 28, 1916.
1,238,047.
Patented Aug. 21, 1917.
5 SHEETS—SHEET 2.
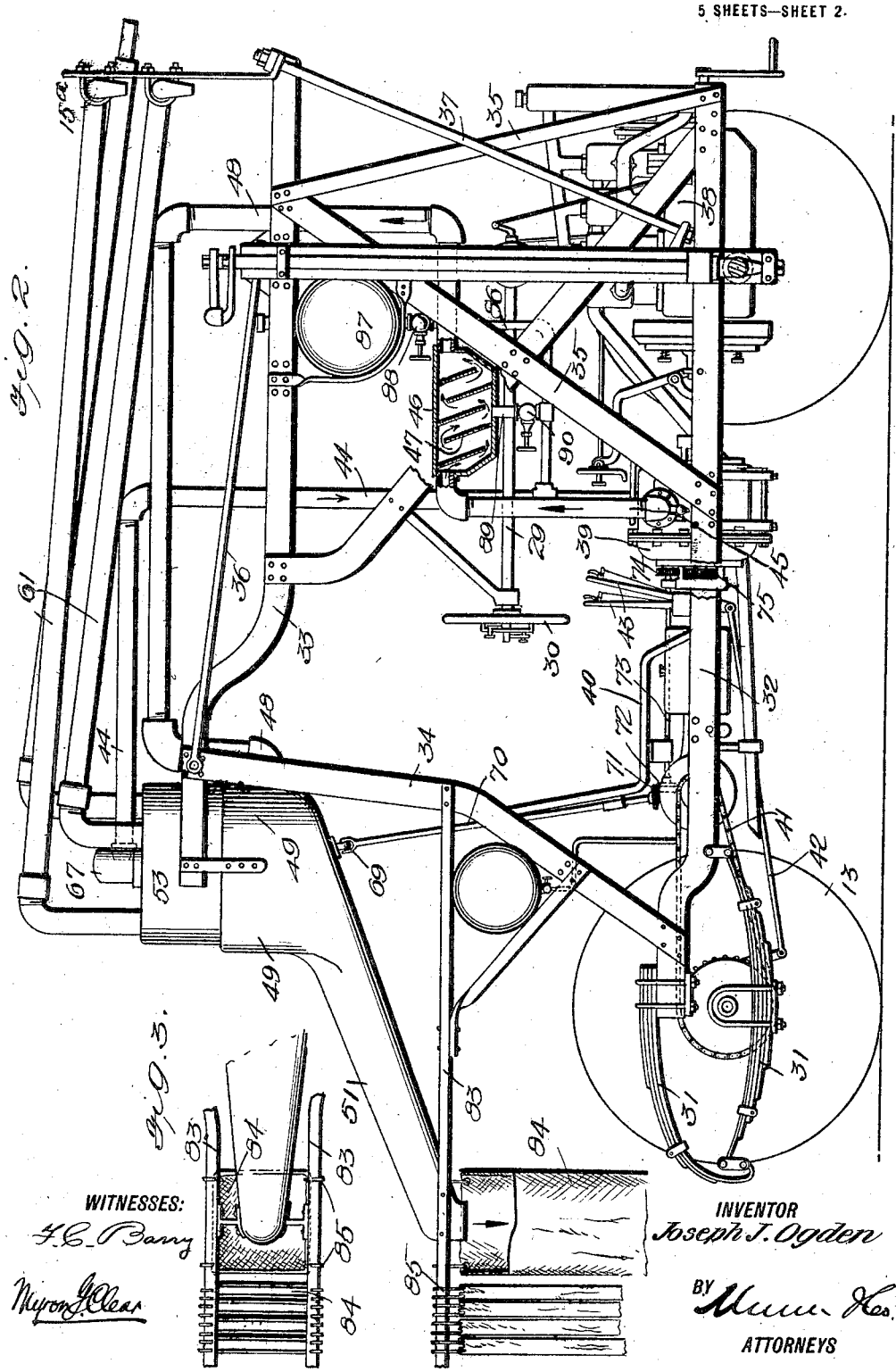
WITNESSES:
INVENTOR
Joseph J. Ogden
BY
ATTORNEYS

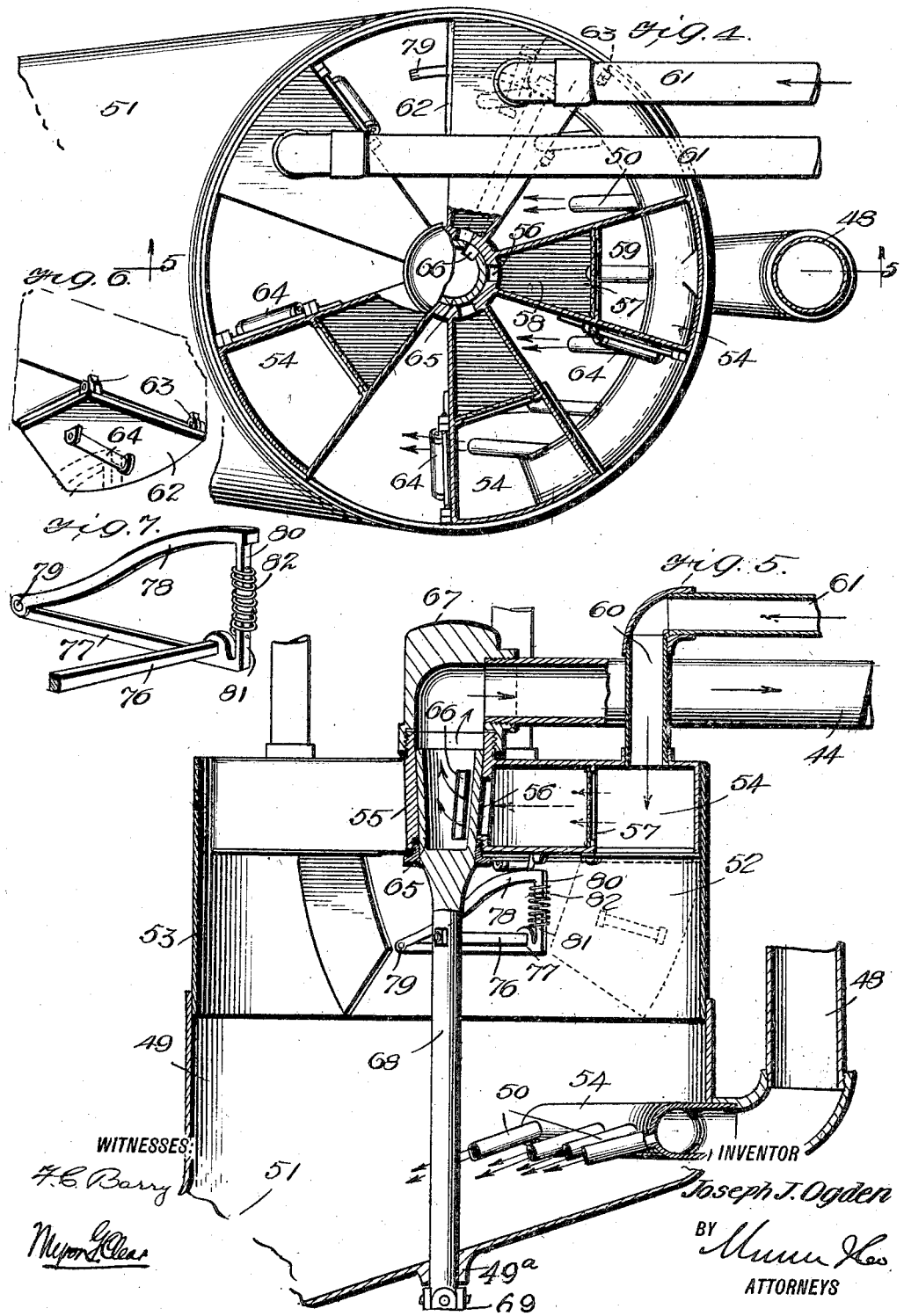

J. J. OGDEN.
COTTON HARVESTER.
APPLICATION FILED APR. 28, 1916.
1,238,047.
Patented Aug. 21, 1917.
5 SHEETS—SHEET 4.
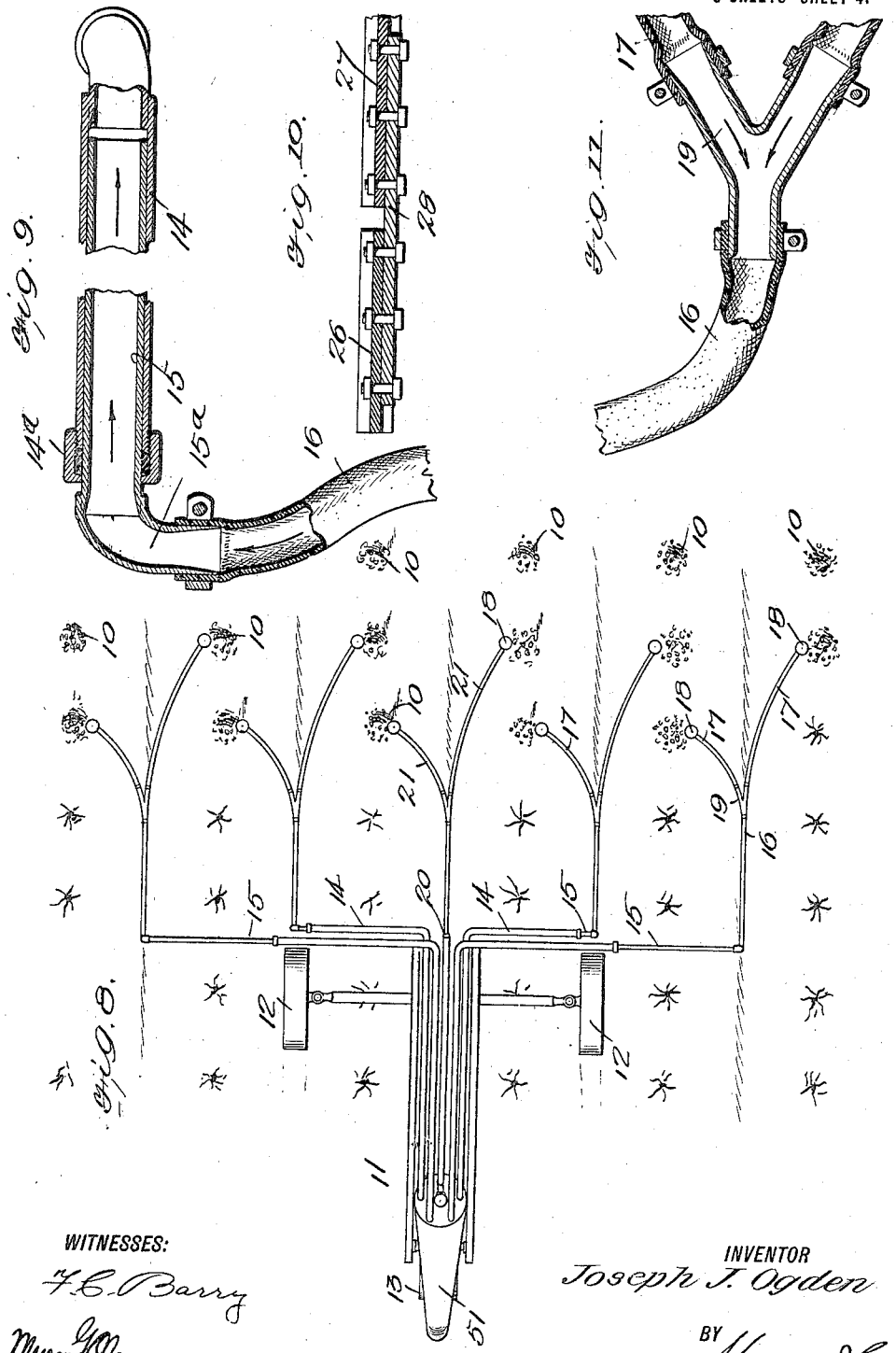
WITNESSES:
F. C. Barry
Myron G. Ola
INVENTOR
Joseph J. Ogden
BY
Munn & Co.
ATTORNEYS J. J. OGDEN.
COTTON HARVESTER.
APPLICATION FILED APR. 28, 1916.
1,238,047.
Patented Aug. 21, 1917.
5 SHEETS—SHEET 5.
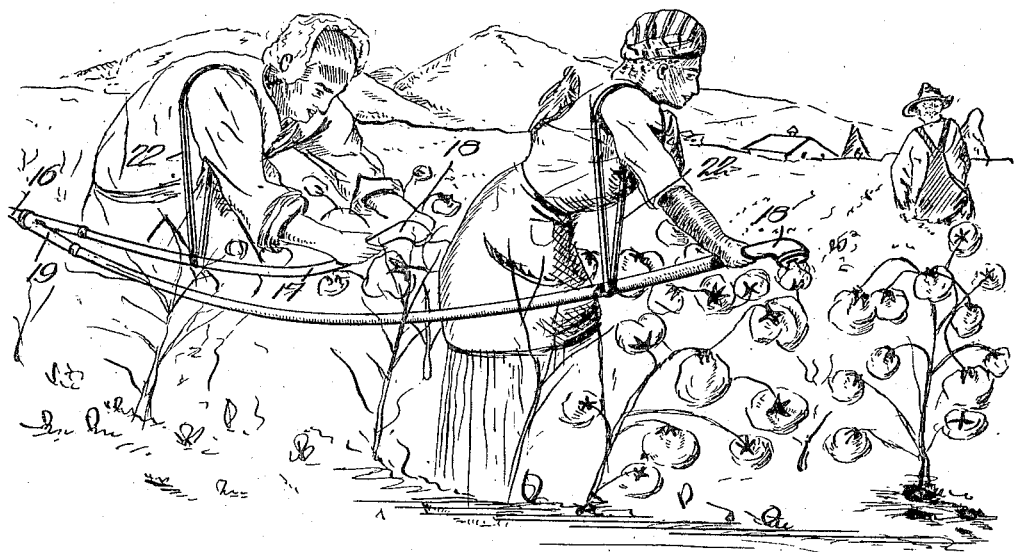
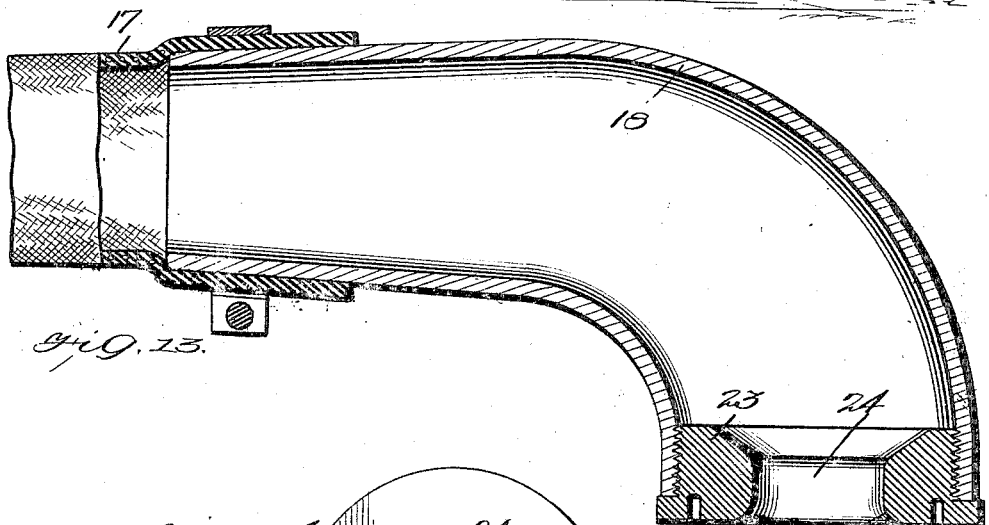
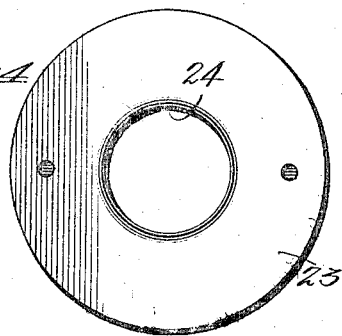
INVENTOR
Joseph J. Ogden
BY
ATTORNEYS

UNITED STATES PATENT OFFICE.

JOSEPH J. OGDEN, OF NEW ORLEANS, LOUISIANA, ASSIGNOR TO COTTON HARVESTER COMPANY OF AMERICA, INC., OF NEW ORLEANS, LOUISIANA, A CORPORATION OF LOUISIANA.

COTTON-HARVESTER.

1,238,047.  Specification of Letters Patent.  Patented Aug. 21, 1917.

Application filed April 28, 1916. Serial No. 94,189.

*To all whom it may concern:*

Be it known that I, JOSEPH J. OGDEN, a citizen of the United States, and a resident of New Orleans, in the parish of Orleans and State of Louisiana, have invented a certain new and useful Improvement in Cotton-Harvesters, of which the following is a specification.

My present invention relates generally to cotton harvesters, and more particularly to a self-propelled vacuum induced suction machine for picking cotton, the primary object of my invention being to provide a machine capable of effective use in the field for this purpose.

As well known, there are usually three crops of cotton picked at separate times, and it is therefore my aim to provide a machine capable of operation in the field without injuring or otherwise endangering the cotton plants during the first and second pickings, so as to impair their production for the second or third picking.

A further object is to provide a vacuum induced suction means including nozzles which will suck up the cotton, without detaching or taking up the leaves or other matter which cannot be separated in the ginning of the cotton.

A further object is to provide a novel vacuum induced suction means including adjustable suction lines, and means whereby to automatically direct the full force of the vacuum successively into the several suction lines.

A still further object of the invention is to provide a novel vacuum induced arrangement including a vacuum pump, and means whereby to provide for both the suction and discharge lines of the pump in the handling of the cotton.

These and the various objects of my invention, together with the advantages resulting therefrom, will be better understood by reference to the following description of the construction, arrangement, and operation of the several parts, reference being made to the accompanying drawings, forming portions of this specification, and in which—

Figure 1 is a front elevation of my improved apparatus.

Fig. 2 is a side elevation thereof.

Fig. 3 is a detail plan view of a portion of the apparatus as seen in Fig. 2.

Fig. 4 is an enlarged view, partly in plan, and partly broken and in section, of a portion thereof.

Fig. 5 is a vertical section taken substantially on line 5—5 of Fig. 4.

Fig. 6 is a detail perspective view of a portion of Fig. 4.

Fig. 7 is a similar view of the door closing member seen in Fig. 5.

Fig. 8 is a diagrammatic plan view illustrating the position of my improved apparatus in the field.

Fig. 9 is a detail sectional view through one of the laterally adjustable connecting pipes.

Fig. 10 is a detail horizontal section taken substantially on line 10—10 of Fig. 1.

Fig. 11 is a detail sectional view through one of the Y-couplings for the branch tubes.

Fig. 12 is a diagrammatic perspective view illustrating the practical use of the suction lines and nozzles.

Fig. 13 is an enlarged detail section through one of the nozzles, and

Fig. 14 is an elevation of the mouth plug of one of the suction nozzles.

Referring briefly to Fig. 8, the advantages of my improvements in the field, as well as the action thereof, may be better understood as a preliminary to more specific description of the reasons for such advantages and the means by which the action takes place. In this figure, several parallel spaced rows of cotton plants are indicated at 10, my improvements being generally indicated at 11, and being shown as portable within the field upon spaced transversely alined forward wheels 12 and a single centrally located rear wheel 13, the lateral space between each of the front wheels 12 and the rear wheel 13, accommodating a row 10 of cotton plants.

The vacuum induced suction means to be hereinafter described, include laterally projecting pipes 14 at the front of the machine into which telescope connecting tubes 15, the latter having their other ends connected with flexible suction lines 16 in turn having outer branches 17, the latter of which are provided with the suction nozzles 18.

Thus the machine may accommodate, as shown in Fig. 8, sufficient suction lines and suction nozzles to operate upon at least five rows of cotton at once, a single central suction pipe 20 being provided with branches 21 having nozzles 18 whereby to operate upon the cotton plants in the rows upon opposite sides of the space within which the rear wheel 13 operates.

The suction lines 16 just above mentioned are in the nature of flexible tubes, wire bound to prevent their collapsing under the effect of the suction therein, these being connected to the similarly constituted branches 17 by means of Y-couplings 19, one of which is shown in detail in Fig. 11, the opposite ends of the suction lines 16 being connected to the angular outer ends 15ª of the telescoping inner tubes 15, the opposite ends of which are movable into the pipes 14, the latter having stuffing boxes 14ª at their outer ends as particularly seen in the detail Fig. 9, in order to prevent loss of air pressure. From this latter figure, as well as from Fig. 11, it will be noted that the edges of metal parts in the path of cotton from the nozzles 18, are reamed out so as to obviate obstructions to the cotton in its passage through the same.

Each of the nozzles 18, one of which is seen in detail in Fig. 13, consists of a tubular body, one end of which is secured to the outer end of the respective branch tube 17, the nozzle being controlled and directed by the user and being preferably controlled by a strap 22 attached to its respective branch 17, and extended around a portion of the user's body, as seen in Fig. 12, so as to prevent the nozzle from dropping to the ground and sucking dirt into the suction line. The body of each of the suction nozzles 18 is curved in its length and has its outer enlarged end internally threaded for the reception of a plug 23, the latter provided with a central cotton-receiving opening 24, of constricted dimensions, and the outer edge of which opening is rounded as seen at 25, the size and shape of which opening or mouth 24, combined with the action of the in-drawn air, serving to receive the cotton without detaching the leaves and sucking the latter therein, as hereinafter more fully described.

The portable machine as proposed by my invention, and as shown particularly in Figs. 1 and 2, includes a forward inverted U-shaped frame in angular side sections 26 and 27, as best seen in Fig. 1, the upper inner ends of which are detachably connected by means of a fish plate 28 in order that the sections 26 and 27 may be adjusted laterally relative to one another and thus adjustably space the forward side wheels 12 before referred to, in accordance with the spacing between the rows of plants 10, the said wheels 12 being supported at the lower ends of the frame sections 26 and 27 and being controlled through steering connections 28ª from a lower horizontal steering post 29, at the rear end of which is a steering wheel 30. The rear central wheel 13 is rotatably supported by means of springs 31, at the rear end of a lower horizontal frame including parallel side members 32, this latter frame being connected to an upper frame 33 by means of vertical beams 34 and 35, and with the side sections 26 and 27 of the forward inverted U-shaped frame before referred to, by brace rods 36 and 37.

At the forward portion of the lower frame just referred to, is supported a motor 38, upon the rearwardly projecting shaft of which, at an intermediate point, is mounted a centrifugal vacuum pump 39, forwardly of the operator's seat 40 above which the steering wheel 30 before mentioned projects. The rear end of the motor shaft is geared to the central rear wheel 13 through a sprocket chain 41, rotation of the rear wheel 13 being controlled through a clutch actuated through connections 42 from one of the control levers 43 located in advance of the operator's seat 40.

The centrifugal vacuum pump 39 has an intake pipe 44 and a discharge pipe 45, the latter leading to a trap 46 having therein baffle plates 47 staggered with respect to one another to cause the air discharge from the pump through a tortuous path through the trap before its entrance into the blast pipe 48, the latter of which leads into a cotton hopper 49 supported at the rear end of the upper frame 33, said blast pipe 48 being provided within the hopper with a plurality of short blast tubes 50, as best seen in Fig. 5, directed rearwardly and downwardly and toward the rearwardly and downwardly inclined spout 51 of the hopper. Certain of the baffle plates 47 may have minute perforations at the base of the trap to permit of thorough drainage, as presently described.

The hopper 49 is cylindrical with an upper open end, and supported thereon is a synchronizer 52 including a cylindrical casing 53 in the upper portion of which are formed a series of air chambers 54 radiating from a central hub 55 having a tapering bore and having side openings 56 leading into the several air chambers 54, all as plainly seen by reference to Figs. 4 and 5.

Each of the air chambers 54 is divided by a central transverse partition 57 into inner and outer portions 58 and 59, the hub opening 56 opening directly into the former, and the rear downturned end 60 of the respective suction pipe 61 opening downwardly into the latter, the forward ends of the suction pipe 61 connecting with the forward laterally projecting suction pipe 14 before referred to. The partition 57 just referred to is formed of some reticulated material which will admit of the passage of air therethrough, but impede the progress of cotton, so as to hold the latter within the outer portion 59 of the chamber 54, the lower open end of which chamber may be closed by a vertical swinging door 62 hinged at one side at 63 to the chamber and provided upon its under surface with a roller 64, as best seen by reference to the detail Fig. 6.

The hub portion 55 before referred to, receives in its bore a similarly tapered plug 65, the upper end of which is open, and the wall of which is provided with a single slotted opening 66, adapted in the rotation of the plug to successively aline with the several wall openings 56 before mentioned of the said hub, the latter having a cap 67 closing its upper end and receiving the rear upper end of the intake pipe 44 of the pump 39.

The valve plug 65 is rigid upon the upper end of a vertical shaft 68 depending axially through the casing 53, and the hopper 49 and through a bearing 49ª in the lower portion of the latter, the lower extremity of shaft 68 being connected by a universal coupling 69 to an inclined connecting rod 70, the lower end of which is provided with a gear 71 in mesh with a similar gear 72 upon the rear end of a shaft 73, the forward end of the latter of which is provided with a pinion 74 in mesh with a pinion 75 upon the motor shaft.

Thus during the rotation of the valve plug 65 through the connections just described, the full force of the vacuum in the pump intake pipe 44 and the cap 67, is communicated to each of the suction pipes 61 as the valve opening 66 comes into register with the pump opening 57 of the air chamber 54 thereof, so that each of the suction lines is subjected to an intermittent or pulsating action of the air, reproducing at the nozzle a pull upon the cotton much resembling that of hand picking.

As the cotton passes through the air lines to the respective chamber 54, it is held within the outer portion 59 of the chamber in view of the foraminous partition 57, the lower door 62 of the respective air chamber being closed at that time. In the further movement of the valve 65, however, and when suction is cut off from the chamber just referred to, the door 62 drops and permits the cotton to fall into the hopper 49, from whence it is forced rearwardly and downwardly through the pipe 51, due to the action of the blast tube 50.

In order to close the doors 62 of the several air chambers at the time, or slightly previous to the time the suction is communicated to the chamber, the shaft 68 is provided with a laterally projecting support 36, within the synchronizer 52, at the outer end of which is a horizontal bracket 77, to one end of which is pivotally connected one end of an upwardly inclined and curved arm 78, the pivot thereof being seen at 79, and the opposite end of the said arm 78 having a depending stem 80 opposing an upstanding stem 81 of the bracket 77, a spring 82 being connected to the stems 80 and 81 to yieldingly hold the arm 78 in its upper position. In the rotation of the shaft 68 the bracket 77 is carried therewith, and the arm 78 successively engages the rollers 64 of the several doors 62, and being spaced as seen in Fig. 4 in proper relative position to the opening 66 of the valve plug 65, elevates the several doors successively into closed position just previous to registration of the said valve opening with the respective air chamber openings 56.

The lower rear end of the hopper spout 51 extends between the rear portions of spaced side bars 83 secured to and projecting rearwardly from the upright beams 34 before mentioned, and constituting a rack upon which a series of bags 84 may be hung by means of hooks 85, so that as each bag becomes full it may be unhooked and dropped and the next rearmost bag advanced to take its place beneath the discharge end of the said spout 51 as best seen in Figs. 2 and 3.

While any particular type of motor 38, transmission, or gearing connections as now utilized in self-propelled vehicles may be employed in connection with my improvements, and likewise any approved type of vacuum pump, I prefer to utilize a centrifugal vacuum pump 39 as before mentioned, to which water must be supplied in the action thereof, water being supplied in the present instance through a pipe 86 depending from a water tank 87 as seen in Fig. 2, and connected to the intake pipe 44 at a point adjacent the pump, a valve 88 being arranged in the water feed pipe 86 adjacent the tank 87, and a pipe 89 being connected thereto and leading from the lower portion of the trap 46, this pipe 89 also having a valve 90. It is to be understood of course that valve 88 is closed except when water is being fed to the pump.

Thus with the pump utilizing water as described, the air discharged through pipe 45 will be freed from its moisture in the trap 46, so that it may be utilized through the blast pipe 48 and through the blast tubes 50 as previously described, without danger of wetting the cotton, the moisture collecting in the trap 46 being returned to the pump through the pipe 89 and through a portion of the intake pipe 44.

From the foregoing it is obvious that a machine as proposed by my invention is well adapted to operation within a cotton field, as seen by again referring to Fig. 8, the forward inverted U-frame being adjustable so that the forward side wheels 12 may be spaced apart to straddle the rows of plants upon opposite sides of the space through which the central rear wheel 13 travels, and that by withdrawing the inner telescoping pipe 15 to the proper point, the several air lines may be extended into the spaces not only the rows of plants just referred to, but also between the next outermost rows, so that in all the machine takes care, in its operation, of the picking of at least five rows at one and the same time, with ten pickers at the nozzles 18.

It is obvious of course that, as constructed, with branches 17, each air line though receiving at each pulsation the full force of the vacuum at the intake side of the pump, has this force divided through the Y-couplings 19, each nozzle thereof receiving one-half of the force of the suction.

It is furthermore obvious that I provide for this purpose a simple compact arrangement, which may be readily controlled, easily operated, and which will in its use enable the picking of a greatly increased amount of cotton as compared to that capable of being picked by hand with the same number of operators or pickers, in a more cleanly condition, without rehandling from the ordinary picker's bag, and one which may be utilized with equal effect in connection with cotton plants greatly varying both as to height, condition, and character of cotton produced thereon.

I claim:—

1. In a cotton harvesting apparatus, the combination of a wheeled frame, suction producing means therein, including laterally projecting suction pipes, at the forward portion of the frame, pipes telescopingly adjustable within said laterally projecting pipes for adjustable extension beyond the frame sides, and flexible suction lines leading from said last named pipes and having suction nozzles at their outer ends.

2. In a cotton harvesting apparatus, the combination of a wheeled frame, suction producing means including suction pipes disposed horizontally at the forward portion of the frame parallel to its transverse axis and laterally adjustable with respect to the frame for extension beyond the sides thereof, and flexible suction lines leading from the said pipes and having suction nozzles at their outer ends.

3. In a cotton harvesting apparatus, the combination of a frame, a vacuum pump therein, a plurality of suction pipes for communication with the said pump, and including portions disposed laterally of the frame, pipes telescopingly adjustable with respect to the said laterally projecting portions of the first pipes, for extension beyond the sides of the frame, and flexible suction lines leading from said last named pipes and having suction nozzles at their outer ends.

4. In a cotton harvesting apparatus, an air pump having an intake pipe and a discharge pipe, a plurality of suction lines for communication with said intake pipe, a cotton receiver into which the cotton is discharged from said suction lines, having a cotton outlet, a plurality of blast tubes in the said receiver extending toward its said outlet, and a blast pipe connected with the said blast tubes and with the discharge pipe of the pump.

5. In a cotton harvesting apparatus, an air pump having an intake pipe and a discharge pipe, a plurality of suction lines for communication with said intake pipe, a cotton receiver into which the cotton is discharged from said suction lines having a cotton discharge spout leading therefrom, and a plurality of blast tubes in the said receiver extending toward its said discharge spout and connected with the discharge pipe of the said pump.

6. In a cotton harvesting apparatus, an air pump having an intake pipe and a discharge pipe, a plurality of suction lines adapted for communication with said intake pipe, a hopper receiving the cotton discharged from the said suction lines and having a discharge spout leading therefrom, and blast tubes within the said hopper extending toward its said outlet and communicating with the said pump discharge pipe.

7. In a cotton harvesting apparatus, a plurality of suction lines having cotton picking nozzles, a controlling member to which the suction lines lead, having a chambered portion provided with openings communicating with said suction lines, a valve within said chambered portion of said controlling member movable to successively register with said openings leading to the suction lines, and vacuum producing means in communication with said valve.

8. In a cotton harvesting apparatus, a casing having a plurality of air chambers, and a hollow hub having openings communicating with said chambers, a valve within the hollow of said hub movable to register successively with the said openings, a suction line leading from each of said air chambers, and a vacuum pump having its intake side connected to said valve.

9. In a cotton harvesting apparatus, a vacuum pump, a casing to which the intake side of the pump is connected, having a plurality of air chambers formed therein, a suction line leading from one side of each of said air chambers, a valve within the said casing controlling communication between the intake side of the pump and the opposite sides of said air chambers, and means for moving the valve to successively register with the said chamber, each of said air chambers having an intermediate foraminous wall to prevent entrance of the cotton into said valve.

10. In a cotton harvesting apparatus, a casing having a central downwardly tapered hub portion and a plurality of air chambers around the hub portion and having openings through the said hub portion communicating with the said chambers, a vacuum pump having its intake side connected to the said hub portion of the casing, and a downwardly tapered valve rotatable within the said hub portion, said valve having a depending stem and having an opening whereby to successively register in its rotation with the said openings leading to the air chambers, and a suction line leading from each of the said air chambers.

11. In a cotton harvesting apparatus, a plurality of suction lines, a vacuum pump, a casing having a hub portion with which the intake side of the pump is connected, and having a plurality of air chambers around the said hub and openings through its hub communicating with the inner portions of the said air chambers, each of said air chambers having inner and outer portions and an intermediate foraminous wall between the said inner and outer portions, the outer portion of each of said air chambers receiving one of the said suction lines and having an upwardly closing door at its lower portion, a valve within the hub portion open to the intake side of the pump and having a side opening, means for rotating the said valve to successively register with the openings in the said air chambers, and means for closing the door of each of said air chambers when the said valve is in registry therewith.

12. In a cotton harvesting apparatus, a plurality of suction lines, a vacuum pump, a casing having a hub portion with which the intake side of the pump is connected and having a plurality of air chambers around the said hub and openings through its hub communicating with the inner portions of the said air chambers, each of said air chambers having inner and outer portions and an intermediate foraminous wall between the said inner and outer portions, the outer portion of each of said air chambers receiving one of the said suction lines and having an upwardly closing door at its lower portion, a valve within the hub portion open to the intake side of the pump and having a side opening, means for rotating the said valve to successively register with the openings in the said air chambers, and means for closing the door of each of said air chambers, when the said valve is in registry therewith, said means including a spring controlled arm rotatable with the said valve to successively engage and elevate the doors of the air chambers to closed position.

13. In a cotton harvesting apparatus, a vacuum pump, a casing to which the intake side of the pump is connected, having a plurality of air chambers formed therein, a suction line leading from one side of each of said air chambers, a valve within the said casing for controlling communication between the intake side of the pump and the opposite sides of said air chambers, means for moving the valve to successively register with said air chambers, each of said air chambers having an intermediate foraminous wall dividing the same into two compartments and an automatically controlled door closing one of the compartments of each chamber.

JOSEPH J. OGDEN.